United States Patent
Wang et al.

(10) Patent No.: US 11,902,307 B2
(45) Date of Patent: Feb. 13, 2024

(54) METHOD AND APPARATUS FOR NETWORK FRAUD DETECTION AND REMEDIATION THROUGH ANALYTICS

(71) Applicant: CyberArk Softward Ltd., Petach-Tikva (IL)

(72) Inventors: Yanlin Wang, Cupertino, CA (US); Weizhi Li, Sunnyvale, CA (US)

(73) Assignee: CyberArk Software Ltd., Petach-Tikva (IL)

( * ) Notice: Subject to any disclaimer, the term of this patent is extended or adjusted under 35 U.S.C. 154(b) by 54 days.

(21) Appl. No.: 17/108,612

(22) Filed: Dec. 1, 2020

(65) Prior Publication Data
US 2021/0084062 A1    Mar. 18, 2021

Related U.S. Application Data

(63) Continuation of application No. 15/703,943, filed on Sep. 13, 2017, now abandoned.

(51) Int. Cl.
| | |
|---|---|
| H04L 29/00 | (2006.01) |
| H04L 9/40 | (2022.01) |
| G06F 21/55 | (2013.01) |
| G06F 21/50 | (2013.01) |
| G06F 21/31 | (2013.01) |
| G06N 20/00 | (2019.01) |
| H04L 67/50 | (2022.01) |

(52) U.S. Cl.
CPC .......... *H04L 63/1425* (2013.01); *G06F 21/31* (2013.01); *G06F 21/50* (2013.01); *G06F 21/552* (2013.01); *H04L 63/102* (2013.01); *H04L 63/1441* (2013.01); *G06N 20/00* (2019.01); *H04L 63/20* (2013.01); *H04L 67/535* (2022.05)

(58) Field of Classification Search
CPC ............... H04L 63/1425; H04L 63/102; G06F 21/31; G06F 21/50; G06F 21/552
USPC .......................................................... 726/22
See application file for complete search history.

(56) References Cited

U.S. PATENT DOCUMENTS

| | | | |
|---|---|---|---|
| 9,027,134 B2 * | 5/2015 | Foster ...................... | G06F 21/60 |
| | | | 726/22 |
| 9,754,256 B2 | 9/2017 | Britton et al. | |
| 10,021,138 B2 * | 7/2018 | Gill ......................... | H04L 63/20 |

(Continued)

*Primary Examiner* — Jeffrey C Pwu
*Assistant Examiner* — Michael D Anderson
(74) *Attorney, Agent, or Firm* — FINNEGAN, HENDERSON, FARABOW, GARRETT & DUNNER, LLP

(57) ABSTRACT

A system and method for assessing the identity fraud risk of an entity's (a user's, computer process's, or device's) behavior within a computer network and then to take appropriate action. The system uses real-time machine learning for its assessment. It records the entity's log-in behavior (conditions at log-in) and behavior once logged in to create an entity profile that helps identify behavior patterns. The system compares new entity behavior with the entity profile to determine a risk score and a confidence level for the behavior. If the risk score and confidence level indicate a credible identity fraud risk at log-in, the system can require more factors of authentication before log-in succeeds. If the system detects risky behavior after log-in, it can take remedial action such as ending the entity's session, curtailing the entity's privileges, or notifying a human administrator.

23 Claims, 5 Drawing Sheets

(56) References Cited

U.S. PATENT DOCUMENTS

| | | |
|---|---|---|
| 2005/0018618 A1 | 1/2005 | Mualem et al. |
| 2015/0281287 A1 | 10/2015 | Gill et al. |
| 2017/0236080 A1* | 8/2017 | Singh .................... G06N 5/022 |
| | | 705/7.28 |

* cited by examiner

- - PRIOR ART - -

METHOD AND APPARATUS FOR NETWORK FRAUD DETECTION AND REMEDIATION THROUGH ANALYTICS

RELATED APPLICATION

This application is a continuation of U.S. utility application Ser. No. 15/703,943, filed Sep. 13, 2017, the content of which is incorporated here by reference in its entirety.

BACKGROUND

Authentication and authorization are critical to the security of any computer network. Authentication verifies the identity of an entity (person, process, or device) that wants to access a network and its devices and services. Authorization determines what privileges that an entity, once authenticated, has on a network during the entity's session, which lasts from log-on through log-off. Some privileged entities may access all resources, while other entities are limited to resources where they may do little to no harm. Without successful authentication and authorization, a network and its resources are open to fraudulent intrusion.

Authentication requires a method to identify and verify an entity that is requesting access. There is a wide variety of methods to do this that range from a simple username/password combination to smart cards, fingerprint readers, retinal scans, passcode generators, and other techniques. Multifactor authentication combines two or more of these authentication methods for added security. All of these methods have evolved to meet the constant challenge of defeating increasingly sophisticated unauthorized access.

Authorization occurs after authentication, typically through a network directory service or identity management service that lists privileges for each entity that may log into the network. The privileges define what network resources-services, computers, and other devices—the logged-in entity may access. When an entity requests to use a network resource, the resource checks the entity's privileges and then either grants or denies access accordingly. If an entity does not have access to a resource, the network may allow the entity to log in again, providing a new identity and verification to gain additional privileges in a new session.

Problems with Prior Art

As authentication methods increase in effectiveness, they often get harder to use and may still have weaknesses that allow unauthorized access.

The standard authentication method of username and password is very easy to use—it requires only the simple text entry of two values—but it is also not very secure.

It is often easy for an identity thief to guess or steal the username/password combination.

Requiring smart card insertion is more secure than a username/password combination, as is biometric authentication such as reading a fingerprint or scanning a retina. But these methods require special readers or scanners plugged into a log-in device that can be expensive or inconvenient to attach. They can also be defeated by a determined identity thief who can steal a card or copy a fingerprint or retina pattern. These authentication methods have an added disadvantage: they do not work for non-human entities such as a computer or a service.

Multifactor Authentication

Multifactor authentication (MFA) increases security by requiring two or more different authentication methods such as a user/password combination followed by a smart-card insertion or a network request to the user's cell phone to confirm authentication. As the number of factors increases, authentication security increases exponentially.

That said, MFA is not foolproof. It is still possible to steal or phish for data and devices necessary to satisfy each factor. And MFA can be difficult to use for anyone trying to log into a network. Each added factor takes added time and effort before a session starts. It is especially time-consuming when a user has to find one or more devices like a cell phone that may require its own authentication and then confirmation for network authentication. If a user has to perform multiple authentications within a session (to gain extra authorization or use special services, for example), it compounds MFA's difficulty.

Adaptive MFA

Adaptive MFA is one solution to the difficulty of using MFA. A network with adaptive MFA can change its authentication requirements depending on detected conditions at log-in. If the conditions indicate a secure environment, the network can require minimal authentication factors to make authentication simple for the entity. If conditions indicate a possible security threat, the network can require additional factors.

For example, if an entity is logging in from a known IP address with a single correct attempt at a username/password combination, the network may require no more authentication than that. If the entity is logging in from an unknown IP address with multiple unsuccessful attempts at a username/password combination before getting it right, the network might require a smart card in addition before authentication is successful.

Adaptive MFA is rule-based, though, which limits its effectiveness because those rules are static. Adaptive MFA can check conditions at log-in and change MFA requirements based on preset rules that grant access, but it is ignorant of an entity's history—its past behavior and whether or not it has been usual or unusual before the current login—and wouldn't know how to act on that history even if known.

For example, if a user works a night shift and typically logs in from midnight to 8 a.m., preset rules might require additional authentication factors if login occurs outside the business hours of 9 a.m. to 5 p.m. The night-time user would always have to provide extra authentication even though his behavior is normal and predictable and there is no extra risk to his login.

Malicious Behavior Within a Session

Once an entity has logged into a network, it can use any network resources for which it has privileges. If a malignant entity is fraudulently logged in, the entity may severely compromise confidential data, change network settings to aid further unauthorized intrusions, install and run malicious software, and cause significant damage to network resources.

This kind of malicious damage often remains undetected for long periods of time-entity behavior is usually unmonitored within a network. If behavior is monitored by security processes, those processes may follow rules to help deter damaging actions such as requiring further authentication, but the processes cannot judge whether the entity's overall actions are suspicious or not and cannot take remedial action.

Network security processes may notify a human administrator of a suspicious action such as an attempt to access extremely confidential information, but by the time a human can look into the entity's actions, it may be too late to take remedial action, especially if the entity is a computer process that acts swiftly. In many cases, malicious behavior remains undetected until a human administrator notices changes or until damage becomes so significant that it becomes readily apparent. By that time it is usually too late to take any kind of remedial action: the damage is done.

Machine Learning for Threat Analysis

Some network security systems may employ machine learning to analyze potential threats to a network. The machine learning may establish a risk assessment model that determines which entity events (such as log-in events) may pose a threat and which may not. An entity event or simply event is defined as any activity carried out by a user, device, or process that is detected and reported by network monitoring mechanisms. In addition to log-in events, other entity events detected and reported by network monitoring mechanisms include but are not limited to starting or ending applications, making requests of running applications, reading or writing files, changing an entity's authorization, monitoring network traffic, and logging out.

These systems typically work using historical event data collected after a user or a set of users gives permission for those events to be analyzed. The systems do not revise their risk assessment model with new events as they happen, so the model may be out-of-date and ineffective. The system may establish, for example, that logins from a specific location pose a threat, but if the network incorporates a branch office at that location, the location may no longer be enough to pose a threat. The risk assessment model may not be updated in time to avoid a number of incorrectly evaluated login attempts.

Current machine learning systems may also require human supervision where humans evaluate and annotate a set of events before giving them to the machine learning system to "teach" the system which types of events are good and which are bad. This takes time and effort, and further ensures that the system's evaluation parameters will be out-of-date.

Current machine learning systems set up a risk assessment model for each event parameter (login time, for example, or location, or number of login attempts), evaluate each parameter of an event, and then aggregate the evaluations to determine total risk. Because the risk assessment does not consider an event's parameters in combination, it misses parameter combinations that might raise alarms even though the individual parameters may not seem risky—for example, a login time that does not seem risky in itself from a login location that also does not seem risky, but taken together raise alarms because logins do not typically occur at that time in that location.

Current machine learning systems typically apply their risk assessment model to a single network function, usually authentication. The model is not easily adapted to detect threats to other functions such as user activity within the network. Reworking the machine learning system to apply to other functions takes human administrative work that may prevent applying the system to those other functions.

SUMMARY OF THE INVENTION

Embodiments of this invention monitor and store in real time entity events such as network logins and significant user activities after login such as application and device use. An embodiment uses those events to learn standard entity behavior without human assistance, to detect possible risky behavior, and to take remedial action to prevent access or limit activity by a suspicious entity. Because embodiments do not require human assistance, they are much easier to use than prior art.

Each login event stored by an embodiment of the invention includes the conditions when the event occurred such as the device used to log in, location, date and time, and so on. Events after login may include the type of event, date and time, and any other data that might be pertinent to the event.

To analyze an entity's events, an embodiment of the invention builds an entity profile using an entity's live event stream and looks for patterns in the events to determine normal behavior patterns for the entity. An entity profile is a collection of an entity's past events graphed by their parameters in a multi-dimensional array as described below. Each time an embodiment of the invention notes a new entity event, it compares the event to the entity's behavior history as recorded in its entity profile to determine aberrant behavior and therefore increased risk.

When an embodiment of the invention compares an event to behavior history, the embodiment simultaneously considers multiple event parameters which gives it more accuracy in determining aberrant behavior than prior art that considers a single parameter at a pass. An embodiment also uses each new entity event to keep the entity profile up-to-date, an improvement over prior art where entity events are evaluated as historical data at infrequent intervals.

If an embodiment of the invention determines increased risk during or just prior to login (a new location, multiple password attempts, and/or an unusual time of day, for example), it can change login to require more authentication factors. It could, for example, normally require just a username and password for login, but if a login attempt looks risky based on behavior, it could also require using a smart card or even more for particularly risky attempts. If a login attempt looks unusually risky, it could even notify a human administrator.

If an embodiment of the invention notices unusual behavior after login, such as using unusual applications or accessing sensitive devices, an embodiment of the invention can take remedial action. It might, for example, terminate the entity's session, close access to certain resources, change the entity's authorization to limit it to a safe subset of privileges, or contact a human administrator. This is an improvement over prior art that focuses on policing a single type of entity activity, typically login.

An embodiment of the invention defines a set of rules that an administrator can easily adjust to set sensitivity to aberrant behavior and an embodiment's assessment of what it considers risky behavior. The administrator can also easily set the way an embodiment of the invention behaves when it detects risk-how it changes login requirements or authorization in risky situations, for example, or how it handles risky behavior within the network.

Prior Art Security

FIG. 1 shows a standard network security system without an embodiment of the invention.

An access control service 11 authenticates entities and can change authentication factors at login and at other authentication events according to preset rules within the service. It checks entity authentication and authorization with a directory service 13, such as Active Directory®, that defines authentication requirements and authorization for each entity.

The access control service 11 reports login attempts to an event reporting agent 15. The agent 15 may collect other events within the network as described later. The agent 15 reports its collected events to an event logging service 17 that stores the details of the events for later retrieval.

A human administrator may use an admin web browser 19 as a console to manage and read data from the event logging service 17, the event reporting agent 15, the access control service 11, and the directory service 13.

BRIEF DESCRIPTION OF THE DRAWINGS

Embodiments of the invention are illustrated by way of example and not by way of limitation in the figures of the accompanying drawings in which like references indicate similar elements. Note that references to "an" or "one" embodiment in this disclosure are not necessarily to the same embodiment, and such references mean "at least one."

DETAILED DESCRIPTION OF THE INVENTION

An embodiment of the invention operates within a computer network, web portal, or other computing environment that requires authentication and authorization to use the environment's resources.

Assisting Non-Invention Components 21

Figure 1:
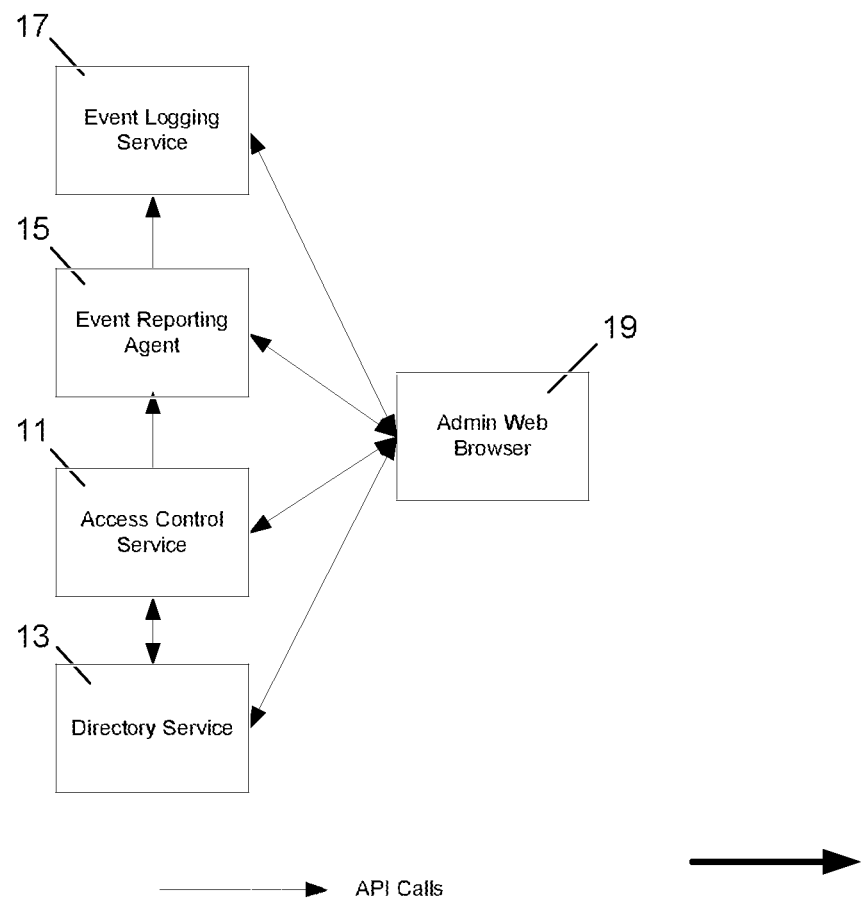
FIG. 1 is a block diagram that shows the components of a prior art network security system as they work without an embodiment of the invention.
Figure 2:
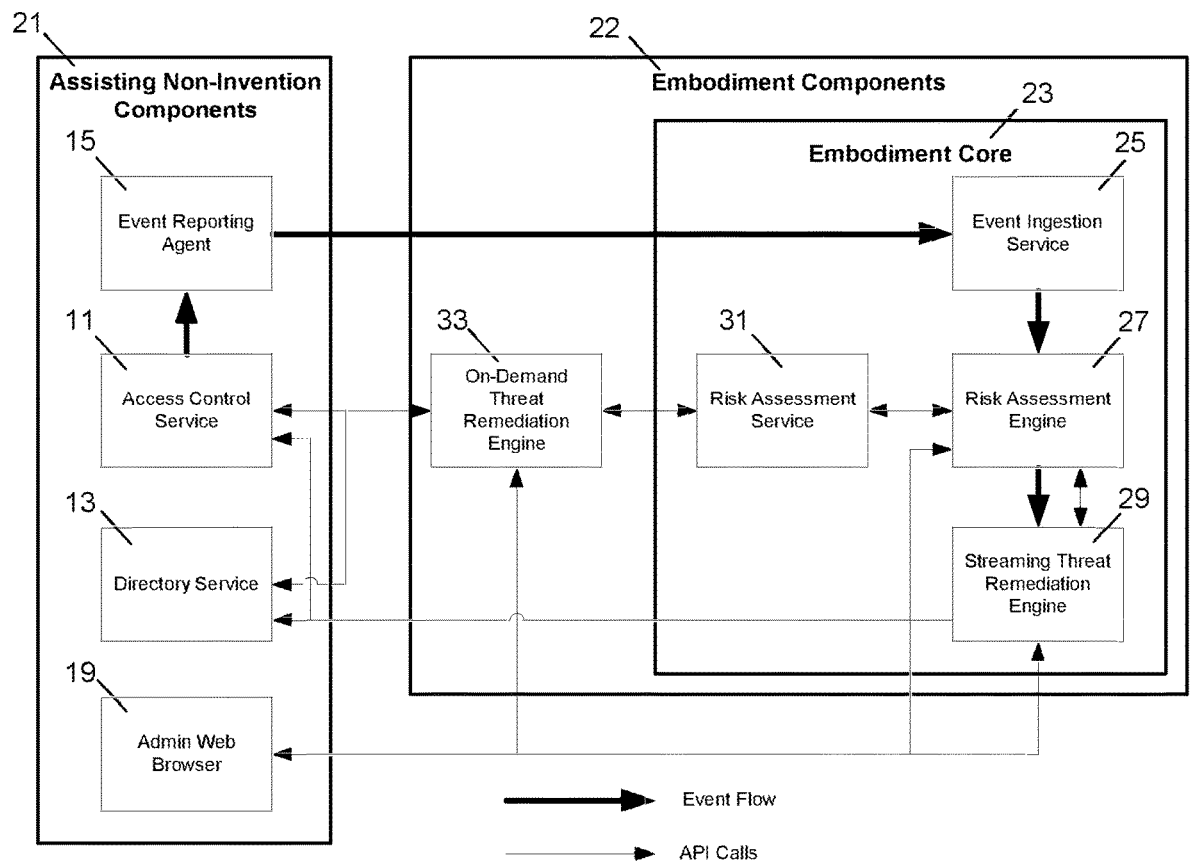
FIG. 2 is a block diagram that shows the components of an embodiment of the invention as they exist in a web portal along with non-invention components also within the portal that assist an embodiment of the invention. The diagram shows possible event flows through the invention with thick arrows, and shows possible communication among components via API calls with thin arrows.

FIG. 2 shows the embodiment's components 22 and the assisting non-invention components 21. An embodiment of the invention works with these assisting non-invention components 21:

An event reporting agent 15 detects entity behavior and reports it to an embodiment of the invention as events, each event with a set of parameters. The event reporting agent 15 can be part of a larger identity service such as a commercially available product known as Centrify Server Suite® available from Centrify Corporation. Entity events typically come from an access control service 11 and can include:

a) Login events, which can include parameters such as the IP address of the device used, the type of device used, physical location, number of login attempts, date and time, and more.

b) Application access events, which can specify what application is used, application type, date and time of use, and more.

c) Privileged resource events such as launching an ssh session or an RDP session as an administrator.

d) Mobile device management events such as enrolling or un-enrolling a mobile device with an identity management service.

e) CLI command-use events such as UNIX commands or MS-DOS commands, which can specify the commands used, date and time of use, and more.

f) Authorization escalation events, such as logging in as a super-user in a UNIX environment, which can specify login parameters listed above.

g) Risk-based access feedback events, which report an embodiment of the invention's evaluations of the entity. For example, when the access control service 11 requests a risk evaluation from an embodiment of the invention at entity log-in, the action generates an event that contains the resulting evaluation and any resulting action based on the evaluation.

An access control service 11 authenticates entities and can change authentication factor requirements at login and at other authentication events. The access control service may be part of a larger identity service such as the Centrify Server Suite®.

A directory service 13 such as Active Directory® defines authentication requirements and authorization for each entity. The directory service may be part of a larger identity service such as the Centrify Server Suite®.

An admin web browser 19 that an administrator can use to control an embodiment of the invention.

Embodiment Components 22

An embodiment of the invention has five primary components. Four of these components reside in the embodiment's core 23 where they have secure access to each other:

The event ingestion service 25 accepts event data from the event reporting agent 15, filters out events that are malformed or irrelevant, deletes unnecessary event data, and converts event data into values that the risk assessment engine 27 can use.

The risk assessment engine 27 accepts entity events from the event ingestion service 25 and uses them to build an entity profile for each entity. Whenever requested, the risk assessment engine 27 can compare an event or attempted event to the entity's profile to determine a threat level for the event.

The streaming threat remediation engine 29 accepts a steady stream of events from the risk assessment engine 27. The streaming threat remediation engine 29 stores a rule queue. Each rule in the queue tests an incoming event and may take action if the rule detects certain conditions in the event. A rule may, for example, check the event type, contact the risk assessment engine 27 to determine risk for the event and, if fraud risk is high, require additional login or terminate an entity's session.

The risk assessment service 31 is a front end for the risk assessment engine 27. The service 31 allows components outside the embodiment core 23 to make authenticated connections to embodiment core components and then request service from the risk assessment engine 27. Service is typically something such as assessing risk for a provided event or for an attempted event such as log-in.

An embodiment of the invention has a fifth component that resides outside the embodiment core 23 where non-invention components 21 may easily access it:

The on-demand threat remediation engine 33 is very similar to the streaming threat remediation engine 29. It contains a rule queue. The rules here, though, test attempted events such as log-in requests or authorization changes that may require threat assessment before the requests are granted and the event takes place. An outside component such as the access control service 11 may contact the engine 33 with an attempted event. The engine 33 can request risk assessment from an embodiment of the invention through the risk assessment service 31.

The Event Ingestion Service 25

The event ingestion service 25 receives event data from the event reporting agent 15 through any of a variety of methods. It might, for example, subscribe to an event-reporting service maintained by the event reporting agent or query through an event-reporting API.

The event reporting agent 15 typically reports some events that aren't of interest for entity risk analysis. They may be invalid events, for example, that have a missing time stamp, have a missing or wrong version number, or may not be reported from a valid data collection event reporting agent 15. Some event types may not be useful for entity behavior analysis-non-entity events such as cloud status reports, or entity events that report behavior not currently used for risk analysis such as a financial billing event. The event ingestion service 25 is set to recognize these events and filter them out.

The event reporting agent 15 may also report useful events that may be in a format that is not usable by the risk assessment engine 27. The data in the event may be in text format, for example, or it may include information that has nothing to do with risk analysis. The event ingestion service 25 removes unusable data, converts data into values usable by the risk assessment engine 27, and passes the converted events on to the risk assessment engine 27.

To convert event data into values usable by the risk assessment engine 27, the event ingestion engine 25 looks for applicable event attributes within the event. Some of those attributes have numerical values, others have categorical values such as device type. The event ingestion engine 25 uses well-known statistical techniques such as one-hot conversion and binary conversion to convert categorical values into numerical values. The event ingestion engine 25 then scales and normalizes numerical values using well-known statistical techniques so that the values fall within a consistent and centered range when plotted in an array.

The Risk Assessment Engine 27

Figure 3:
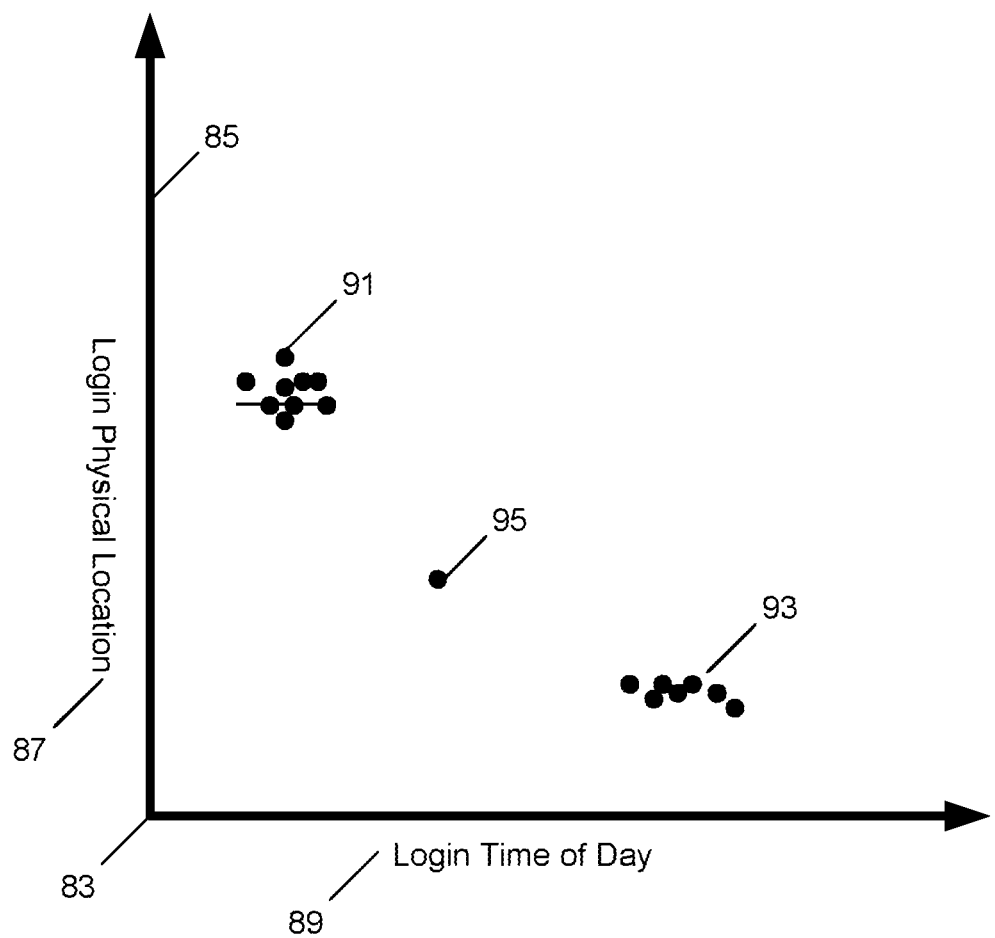
FIG. 3 is a diagram of a profile's event mapping in an N-dimensional array, in this example two dimensions that correspond to login location and login time.

The risk assessment engine 27 receives a stream of entity events from the event ingestion service 25. The engine 27 uses well-known unsupervised real-time machine learning techniques to build an entity profile for each entity with reported events and then, when requested, to determine unusual behavior on the part of that entity. FIG. 3 shows how the risk assessment engine 27 builds an entity profile.

To build an entity profile, the risk assessment engine 27 plots each of an entity's events on a multi-dimensional array 83. The array 83 has an axis 85 for each type of event parameter. It could, for example, be a seven-dimensional array 83 with an axis 85, each axis for an event's date, time, location latitude, location longitude, device type, IP address, and number of log-in attempts. The array 83 in practice may have many more dimensions to record other event parameter types. In FIG. 3, the array 83 has only two axes 85 to provide a simple visual representation of a multi-dimensional array 83: a vertical axis 87 plotting physical location of a login attempt and a horizontal axis 89 plotting the time of day when a login attempt occurs.

An entity event's parameters are numerical values that represent the character of the parameter—the number of seconds past midnight for time of day, for example. The engine 27 plots the event location 91 in the entity profile array 83 using those parameter values. As the events accumulate in the array 83, clusters 93 of events with similar parameter values appear. Those clusters 93 represent typical behavior for the entity. In FIG. 3, two clusters 93 appear, one for a time of day when a user attempts login early in the day at or near her place of work, the other for a time of day when the user attempts login after work at or near her home.

The risk assessment engine 27 detects those clusters 93. When another component (typically one of the two remediation engines 29 and 33) requests risk assessment for an event, the engine 27 checks the event location's 91 proximity to existing clusters 93. If an event is too far from a cluster, it is an anomaly 95 because its parameters show unusual behavior by the entity.

The risk assessment engine 27 assigns a risk score and confidence score for an assessed event. The risk score is based on the event location's 91 distance from existing clusters 93—the further the distance, the higher the risk score. The confidence score is based on the number of events recorded in an entity's profile and the length of time over which the events have been reported—more events over a greater number of days provides more confidence because there is more data to analyze and a greater chance to detect behavior patterns that vary over time. Fewer events over a shorter number of days provides less confidence in behavior analysis.

The risk assessment engine 27 may use the risk and confidence scores to assign one of five fraud risk levels to the assessed event:
  a) Unknown: there are not enough events in the entity profile over a long enough period of time to successfully determine fraud risk.
  b) Normal: the event looks legitimate.
  c) Low Risk: some aspects of the event are abnormal, but not many.
  d) Medium Risk: some important aspects of the event are abnormal, some are not.
  e) High Risk: many key aspects of the event are abnormal.

The risk assessment engine 27 can decay clusters 93 in the entity profile—that is, give older clusters 93 less weight in analysis and possibly remove them entirely if they get too old. This helps the accuracy of behavior analysis by accommodating changing entity behavior over time. For example, a user might move to a new country where his location, IP address, and other behavior parameters change. After long enough in the new country, new event clusters 93 appear in the user's profile while old clusters 93 fade and eventually disappear.

The risk assessment engine 27 can return an event's risk score, confidence score, and fraud risk level to the requester, which can take action if appropriate.

An administrator can control the risk assessment engine's 27 behavior through a console that is typically provided through a web browser 19 connected to the engine 27 or another part of an embodiment of the invention connected to the engine. The administrator can adjust behavior such as anomaly 95 detection, risk and confidence score assignment, and event decay time. The risk assessment engine 27 is also capable of adjusting itself as it learns more effective analysis techniques with repeated exposure to events.

The Streaming Threat Remediation Engine 29

The streaming threat remediation engine 29 accepts the stream of events that came from the event ingestion service 25 and passed through the risk assessment engine 27. The remediation engine 29 runs each event through a rule queue.

Each rule is a piece of code that executes to test the event's attributes such as event type, time of execution, and others. A rule can request risk assessment of the event from the risk assessment engine 27 as an additional event attribute.

Depending on the results of the event's property tests (which can include testing the risk assessment attribute), a rule can take action or not. That action might be to execute an associated script. The script can work with other network components such as the access control service 11 or the directory service 13 to take remedial action for an event with assessed fraud risk. The script might log an entity out, for example, or change the entity's authorization level. The rule's action might also be to jump to another rule in the queue.

If a rule takes no action, the event passes to the next rule in the queue. Most events pass completely through the rule queue without triggering any action.

An administrator can control the streaming threat remediation engine 29 through the engine's console on a web browser 19 or through other interfaces such as an API. The administrator may create rules, reorganize the rule queue, associate scripts to carry out remedial actions, and perform other administrative actions.

The Risk Assessment Service 31

Components outside the embodiment core 23—on another server, for example—cannot directly request risk assessment from the risk assessment engine 27. Outside access to the risk assessment engine 27 is important, though, for assessing attempted events such as log-in requests that are not yet granted and have not yet become internally processed events.

The risk assessment service 31 provides a front end for the risk assessment engine 27: it provides a contact point where external components can authenticate, establish a secure connection, and then request attempted event risk assessment from the risk assessment engine 27. The risk assessment service 31 converts data in the supplied attempted event into values that the risk assessment engine 27 can use. The risk assessment service 31 converts data in the same way that the event ingestion engine 25 converts streaming event data into values usable by the risk assessment engine 27. After data conversion, the risk assessment service 31 passes attempted event risk evaluation requests on to the risk assessment engine 27 and returns the results to the requester.

The On-Demand Threat Remediation Engine 33

The on-demand threat remediation engine 33 is similar to the streaming threat remediation engine 29. It contains a rule queue that tests and carries out conditional actions that may include executing scripts. It has two principal differences, though: it resides outside the embodiment core 23 so that it is easily accessible to external components, and it handles attempted events (events that are waiting permission to execute) rather than already-executed events.

Attempted events are typically authentication requests such as log-in requests that come in through the access control service 11. The request must wait for access control service 11 approval before it is granted and the log-in becomes an executed event. While the request is pending, the access control service 11 can contact the on-demand threat remediation engine 33 with the attempted event, which includes pertinent properties such as the time and place of the request, the originating device for the request, and so on.

The on-demand threat remediation engine 33 runs an attempted event through its rule queue just as the streaming threat remediation engine 29 runs an executed event through its rule queue. The rules in the queue test the attempted events properties and may request risk assessment for some attempted events.

The on-demand threat remediation engine 33 contacts the risk assessment service 31 when it requests risk assessment. The risk assessment service 31 passes the attempted event in a form that the risk assessment engine 27 can treat as an executed event. When the risk assessment service 31 passes the attempted event on to the risk assessment engine 27, the assessment engine 27 compares the attempted event's event location 91 with clusters 93 in the requesting entity's profile just as it would an executed event to determine risk and confidence scores and fraud risk. The assessment returns to the risk assessment service 31 and then back to the on-demand threat remediation engine 33. The rule that triggered the assessment may then take action such as denying log-in through the access control service 11 if the attempted log-in's threat level is too high.

Handling an Executed Event

Figure 4:
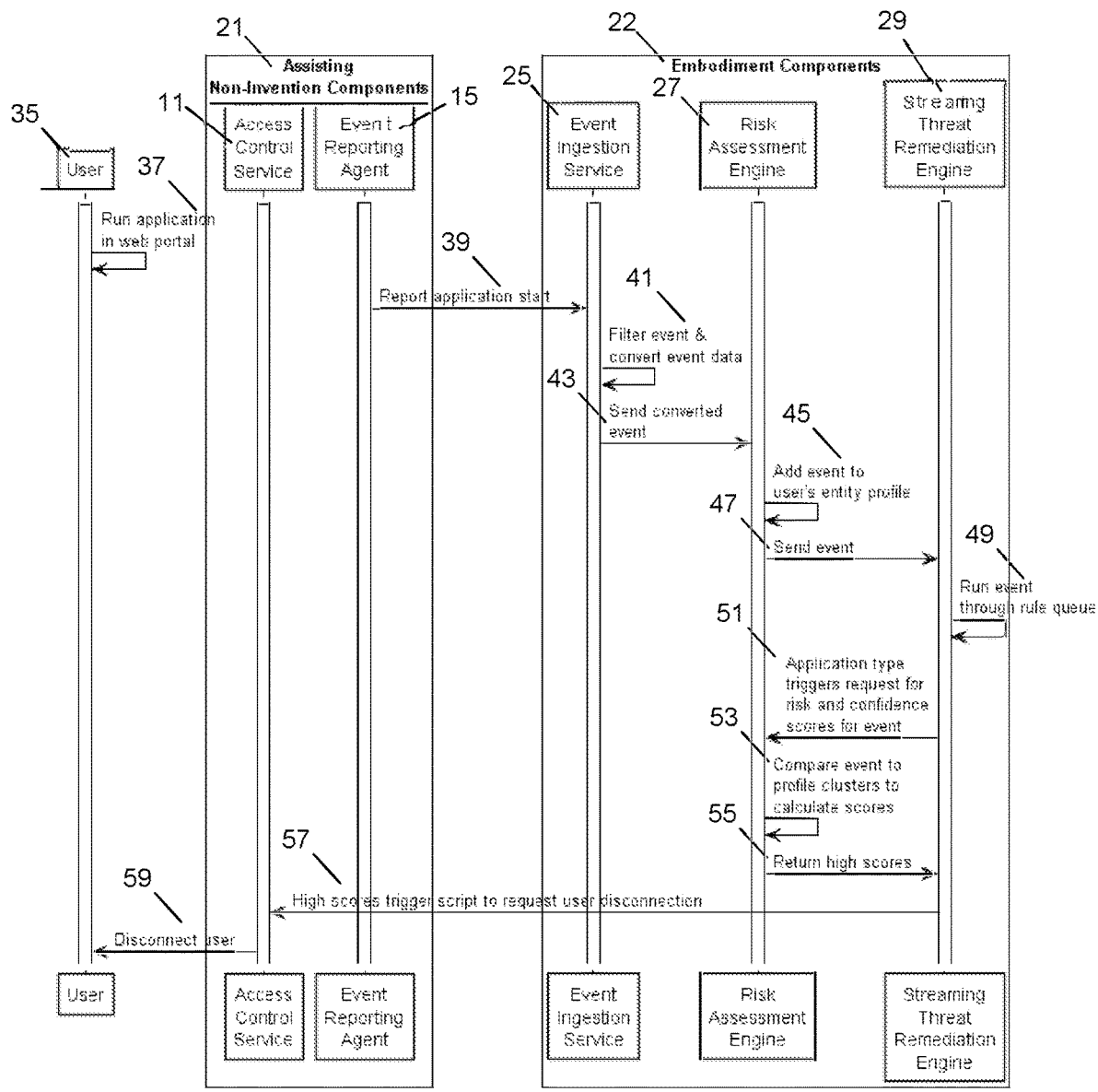
FIG. 4 is a sequence diagram that shows how an embodiment of the invention handles an event that has already occurred within the web portal, in this case a user in a suspect location running a powerful application at an unusual time.

FIG. 4 shows how an implementation of the invention handles an executed event. In this example, an executed event triggers remedial action through the implementation's streaming threat remediation engine 29.

The user 35, who is logged into a web portal that incorporates the invention, starts 37 an administration application that can be used to examine other users' email. The user is a fraudulent user in a suspect location who is active during a time when the user account is not normally used.

The event reporting agent 15 reports 39 the application start event to the event ingestion service 25. The event contains among other things the application type, the user's location, and the date and time of the application start.

The event ingestion service 25 filters and converts 41 the event: the service 25 ensures that the event is not an extraneous event that shouldn't be analyzed, then converts the data in the event into a form that the risk assessment engine 27 can use.

The event ingestion service 25 sends 43 the converted event to the risk assessment engine 27.

The risk assessment engine 27 adds 45 the event to the user's entity profile, where the event's event location 91 is plotted in the profile's multiple-dimensional array 83.

The risk assessment engine 27 sends 47 the event to the streaming threat remediation engine 29.

The streaming threat remediation engine 29 runs 49 the event through the engine's 29 rule chain.

In the streaming threat remediation engine 29, the application type triggers 51 a request for risk and confidence scores for the event. It does so because one of the rules in the rule chain tests for application type, notices a high-risk application, and requests risk and confidence scores from the risk assessment engine 27 for the event.

The risk assessment engine 27 compares 53 the event location 91 to clusters 93 in the entity's profile and notices that the location and time are an aberration 95 because they are not usual for the user. The engine 27 calculates a high risk score because of that. Because (in this example) there are many events in the profile, the engine calculates a high confidence score.

The risk assessment engine 27 returns the high risk and confidence scores to the streaming threat remediation engine 29.

In the streaming threat remediation engine 29, the high scores trigger 57 a script that requests user 35 disconnection from the access control service 11.

The access control service 11 disconnects 59 the user 35.

Handling an Attempted Event

Figure 5:
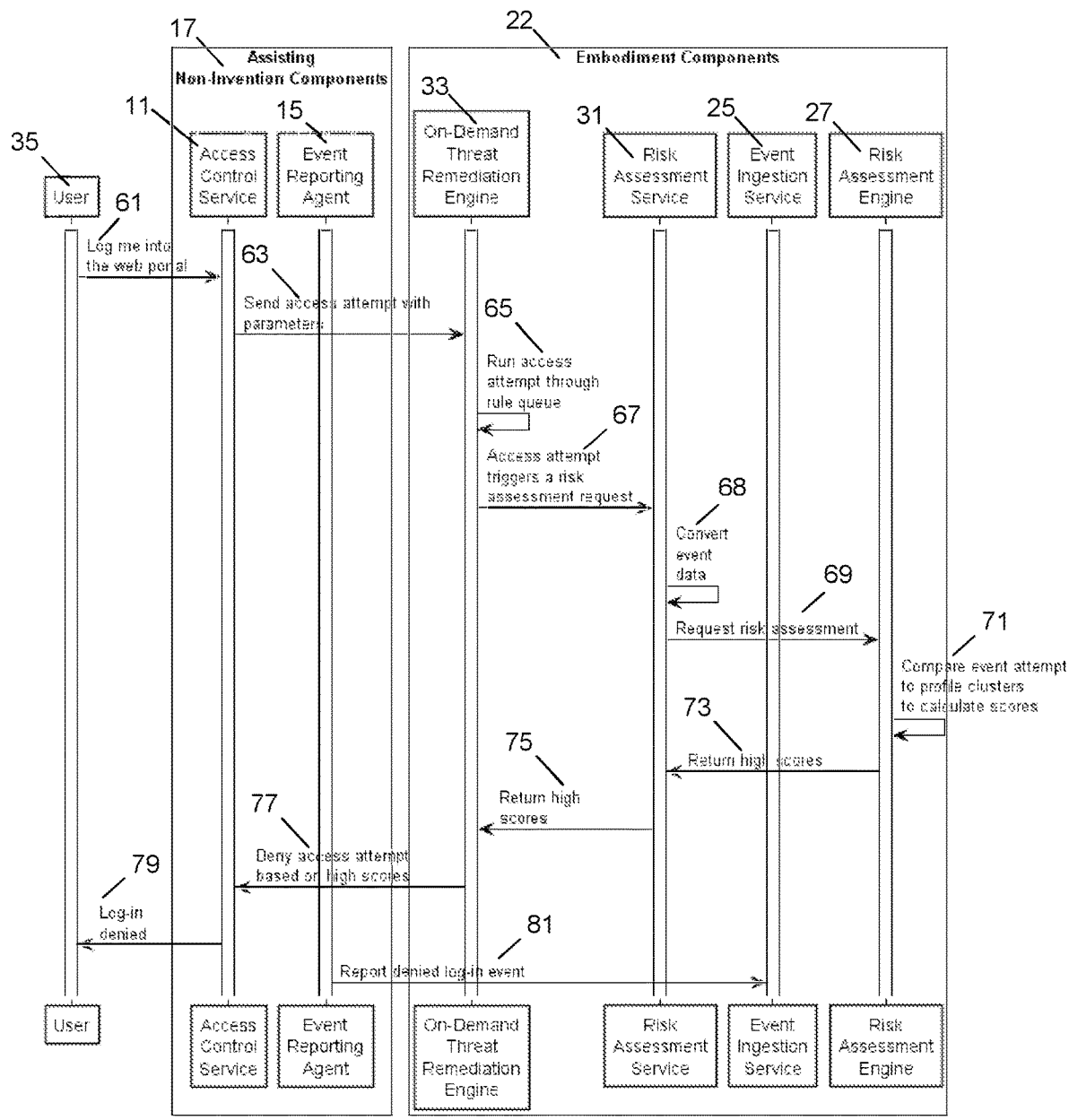
FIG. 5 is a sequence diagram that shows how an embodiment of the invention handles an attempted event, in this case a user request to access the web portal when the user is in an unusual location at a suspect time.

FIG. 5 shows how an implementation of the invention handles an attempted event. The attempted event (a log-in) triggers remedial action through the implementation's on-demand threat remediation engine 33.

The user 35, a hacker from a suspicious location at an unusual time who is not the real user, requests 61 log-in to a web portal that incorporates the invention. The log-in request goes to the portal's access control service 11.

The access control service 11 sends 63 the access attempt with the attempt parameters (including request location and date and time) to the on-demand threat remediation engine 33.

The on-demand threat remediation engine 33 runs 65 the access attempt event through the engine's 33 rule queue.

In the on-demand threat remediation engine 33, the event triggers a rule that recognizes that the event attempts access, which requires risk assessment, so the engine 33 requests 67 risk assessment of the access attempt from the risk assessment service 31.

The risk assessment service 31 converts 68 the data in the access attempt into a form the risk assessment engine 27 can use, then requests 69 risk assessment for the access attempt from the risk assessment engine 27.

The risk assessment engine 27 compares 71 the access attempt to access event dusters 93 in the entity's profile and notices that the location and time are not usual for the user 35. The engine 27 calculates 71 risk scores for the access attempt just as it would for an executed access event. In this case, it calculates high risk scores.

The risk assessment engine 27 returns 73 the high scores to the risk assessment service 31.

The risk assessment service 31 returns 75 the high scores to the on-demand threat remediation engine 33.

In the on-demand threat remediation engine 33, the high scores returned to the engine 33 triggers an access denial that the engine 33 sends 77 to the access control service 11.

The access control service 11 denies 79 the user's 35 log-in request.

The event reporting agent 15 reports 81 the denied access event to the event ingestion service 25.

From this point on, the denied access event goes through an embodiment of the invention just as any other event would, as described previously. The event is recorded in the risk assessment engine's 27 multi-dimensional array 83 and passes through the streaming threat remediation engine 29 for possible action on the event.

Other Implementations of the Invention

The invention may be implemented in alternative ways. An embodiment of the invention may, for example, run within an organization's private network, or across large interconnected networks. Embodiments of the invention may locate components in different locations that may be together within a core or scattered across various locations, and they may consolidate multiple components within a single component that performs the same functions as the consolidated components.

Embodiments of the invention may use methods other than multi-dimensional arrays 83 to assess an event's possible threat.

An embodiment of the invention may be a machine-readable medium having stored thereon instructions which cause a processor to perform operations as described above. In other embodiments/the operations might be performed by specific hardware components that contain hardwired logic. Those operations might alternatively be performed by any combination of programmed computer components and custom hardware components.

A machine-readable medium may include any mechanism for storing or transmitting information in a form readable by any type of processing device.

Although specific examples of how the invention may be implemented are described, the invention is not limited by the specified examples, and is limited only by the scope of the following claims.

The invention claimed is:

1. A system for fraud detection and remediation, comprising:
    at least one processor; and
    at least one non-transitory computer-readable medium containing instructions that, when executed by the at least one processor, cause the system to perform operations comprising:
        accessing first event data for a first event or first attempted event, the first event or the first attempted event corresponding to a first entity;
        determining a first location of the first event or first attempted event in a multidimensional array, the multidimensional array including at least a first axis associated with a first event parameter and a second axis associated with a second event parameter, the first location being defined relative to the first axis and the second axis;
        comparing the first location to at least one first cluster location in the multidimensional array, the at least one first cluster location corresponding to the first entity and representing a behavior history of the first entity;
        determining, based on the comparison of the first location and the at least one first cluster location, a risk score for the first event or the first attempted event;
        determining a confidence score based on a number of events associated with the first entity;
        identifying, based on the risk score, the confidence score, and a rule, a remedial action; and
        providing remediation instructions to perform the remedial action in response to the first event or the first attempted event.

2. The system of claim 1, wherein the first event parameter corresponds to one of an event date, an event time, a geographic location associated with the event, a type of device associated with the event, an internet protocol address, or a number of prior events associated with the event.

3. The system of claim 1, wherein accessing first event data includes:
    obtaining, from an event reporting agent, unprocessed first event data; and
    generating the first event data using the unprocessed first event data.

4. The system of claim 3, wherein generating the first event data comprises converting first categorical values of the unprocessed first event data into first numerical values.

5. The system of claim 1, wherein the operations further comprise updating the at least one first cluster location using the first event data.

6. The system of claim 1, wherein:
the operations further comprise applying the rule to at least one attribute of the first event or the first attempted event; and
the first location is compared to the at least one first cluster location based on a result of the application of the rule.

7. The system of claim 1, wherein the operations further comprise:
obtaining a first stream of event data, the first stream including the first event data;
updating clusters corresponding to entities using the first stream of event data, the entities including the first entity; and
applying a rule queue to the first stream, the rule queue including the rule; and
wherein the first location is compared to the at least one first cluster location based on a result of the application of the first stream to the rule queue.

8. The system of claim 1, wherein:
the first event data is for the first event, the risk score is for the first event, and the remedial action is performed in response to the first event; and
the first event comprises at least one of a login event, application access event, privileged resource event, mobile device management event, command-use event, or authorization escalation event.

9. The system of claim 1, wherein:
the first event data is for the first event, the risk score is for the first event, and the remedial action is performed in response to the first event; and
the first event occurs during a session and the remedial action comprises at least one of terminating the session, restricting access to computing resources available in the session, limiting privileges of the first entity in the session, or providing a notification.

10. The system of claim 1, wherein:
the first event data is for the first attempted event, the risk score is for the first attempted event, and the remedial action is performed in response to the first attempted event;
the remediation instructions are provided to an access control service; and
the remedial action comprises:
denying, by the access control service, the first attempted event, or
requiring, by the access control service, additional authentication to perform the first attempted event.

11. The system of claim 10, wherein the remedial action comprises denying the first attempted event, and wherein the operations further comprise:
obtaining, from an event reporting agent, second event data concerning the denial of the first attempted event; and
updating the at least one first cluster location using the second event data.

12. The system of claim 10, wherein the first attempted event is a login event and the operations further comprise obtaining the first event data from the access control service.

13. A method for fraud detection and remediation, comprising:
by a risk assessment engine:
accessing first event data for a first event or first attempted event, the first event or the first attempted event corresponding to a first entity;
determining a first location of the first event or first attempted event in a multidimensional array, the multidimensional array including at least a first axis associated with a first event parameter and a second axis associated with a second event parameter, the first location being defined relative to the first axis and the second axis;
comparing the first location to at least one first cluster location, the at least one first cluster location corresponding to the first entity and representing a behavior history of the first entity; and
determining, based on the comparison of the first location and the at least one first cluster location, a risk score for the first event;
determining a confidence score based on a number of events associated with the first entity; and
by a streaming threat remediation engine:
obtaining, from the risk assessment engine, the risk score;
identifying, based on the risk score, the confidence score, and a rule, a remedial action; and
providing remediation instructions to perform the remedial action in response to the first event.

14. The method of claim 13, wherein the first event parameter corresponds to one of an event date, an event time, a geographic location associated with the event, a type of device associated with the event, an internet protocol address, or a number of prior events associated with the event.

15. The method of claim 13 wherein accessing first event data includes, by an event ingestion service:
obtaining, from an event reporting agent, unprocessed first event data;
generating the first event data using the unprocessed first event data; and
providing the first event data to the risk assessment engine.

16. The method of claim 15, wherein generating the first event data comprises converting first categorical values of the unprocessed first event data into first numerical values.

17. The method of claim 13, wherein the method further comprises, by the risk assessment engine:
obtaining the first event data from an event ingestion service;
updating the at least one first cluster location using the first event data; and
providing the first event data to the streaming threat remediation engine.

18. The method of claim 13, wherein the method further comprises, by the streaming threat remediation engine:
obtaining the first event data from the risk assessment engine;
applying the rule to at least one attribute of the first event; and
providing to the risk assessment engine a request for the risk score based on a result of the application of the rule.

19. A non-transitory computer-readable medium containing operation instructions that, when executed by at least one processor of a system, cause the system to perform operations comprising:
accessing first event data for a first event corresponding to a first entity;
updating at least one first cluster location in a multidimensional array using the first event, the at least one first cluster location corresponding to the first entity and representing a behavior history of the first entity, wherein the multidimensional array includes at least a first axis associated with a first event parameter and a second axis associated with a second event parameter, and wherein the first cluster location is defined relative to the first axis and the second axis;

determining, based on a rule queue and the first event, that the first event requires a first risk assessment;

performing the first risk assessment, the first risk assessment including:

determining a risk score by comparing a first location of the first event in the multidimensional array to the at least one first cluster location; and determining a confidence score based on a number of events associated with the first entity; and providing, based at least in part on the risk score and the confidence score, remediation instructions to perform a first remedial action concerning the first entity.

20. The non-transitory computer-readable medium of claim 19, wherein the first event parameter corresponds to one of an event date, an event time, a geographic location associated with the event, a type of device associated with the event, an internet protocol address, or a number of prior events associated with the event.

21. The non-transitory computer-readable medium of claim 19, wherein the operations further comprise:

obtaining a second attempted event corresponding to a second entity;

performing a second risk assessment by comparing a second location of the second attempted event to at least one second cluster location corresponding to the second entity; and providing, based at least in part on a result of the second risk assessment, instructions to perform a second remedial action concerning the second attempted event.

22. The non-transitory computer-readable medium of claim 19, wherein the operations further comprise:

obtaining a third event corresponding to the second entity, the third event indicating performance of the second remedial action; and updating the at least one second cluster location based on the third event.

23. The non-transitory computer-readable medium of claim 20, wherein the first event comprises at least one of a login event, application access event, privileged resource event, mobile device management event, command-use event, or authorization escalation event.

\* \* \* \* \*